(12) United States Patent
Sacher

(10) Patent No.: US 10,428,903 B2
(45) Date of Patent: Oct. 1, 2019

(54) TRANSMISSION FOR THE POWERTRAIN OF A RAIL VEHICLE

(71) Applicant: ZF Friedrichshafen AG, Friedrichshafen (DE)

(72) Inventor: Christoph Sacher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 216 days.

(21) Appl. No.: 15/320,400

(22) PCT Filed: Jun. 2, 2015

(86) PCT No.: PCT/EP2015/062247
§ 371 (c)(1),
(2) Date: Dec. 20, 2016

(87) PCT Pub. No.: WO2016/000898
PCT Pub. Date: Jan. 7, 2016

(65) Prior Publication Data
US 2017/0159754 A1 Jun. 8, 2017

(30) Foreign Application Priority Data

Jul. 4, 2014 (DE) ........................ 10 2014 213 010

(51) Int. Cl.
*F16H 3/091* (2006.01)
*B61C 9/12* (2006.01)
(Continued)

(52) U.S. Cl.
CPC ............... *F16H 3/091* (2013.01); *B61C 3/00* (2013.01); *B61C 9/12* (2013.01); *B61C 9/50* (2013.01);
(Continued)

(58) Field of Classification Search
CPC ..... F16H 3/00; B61F 3/04; B61C 9/38; B61C 9/44; B61C 9/46; B61C 9/48
See application file for complete search history.

(56) References Cited

U.S. PATENT DOCUMENTS

| 8,678,969 B2 | 3/2014 | Sato et al. | |
| 2013/0283952 A1* | 10/2013 | Hoeger | B61C 9/50 74/421 A |

FOREIGN PATENT DOCUMENTS

| BE | 471 249 | 8/1947 |
| CN | 201 712 606 U | 1/2011 |

(Continued)

OTHER PUBLICATIONS

German Search Report Corresponding to 10 2014 213 0107 dated Feb. 13, 2015.

(Continued)

*Primary Examiner* — Robert J McCarry, Jr.
(74) *Attorney, Agent, or Firm* — Michael J. Bujold

(57) ABSTRACT

A transmission for the power-train of a rail vehicle, in which the transmission (3) includes an input shaft (4), an intermediate shaft (5) and a drive output shaft (6). The input shaft (4) can be connected so as to be driven by a drive motor (2), and the drive output shaft (6) forms a wheelset shaft of the rail vehicle. The transmission (3) has at least two selectively shiftable transmission stages with different transmission ratios for the same travel direction, and a shifting device (7) for engaging the transmission stages. Furthermore, a power-train for a rail vehicle having a transmission of such type is proposed.

15 Claims, 3 Drawing Sheets

(51) Int. Cl.
*B61C 9/50* (2006.01)
*F16H 3/089* (2006.01)
*B61C 3/00* (2006.01)
*B61C 17/00* (2006.01)
*F16H 61/30* (2006.01)

(52) U.S. Cl.
CPC ............ *B61C 17/00* (2013.01); *F16H 3/089* (2013.01); *F16H 61/30* (2013.01); *F16H 2200/0034* (2013.01)

(56) References Cited

FOREIGN PATENT DOCUMENTS

| | | |
|---|---|---|
| DE | 10 2011 011 867 A1 | 8/2012 |
| DE | 11 2011 105 075 T5 | 1/2014 |
| EP | 0 698 540 A1 | 2/1996 |
| EP | 2 251 223 A2 | 11/2010 |
| EP | 2 626 580 A2 | 8/2013 |

OTHER PUBLICATIONS

International Search Report Corresponding to PCT/EP2015/062247 dated Aug. 28, 2015.
Written Opinion Corresponding to PCT/EP2015/062247 dated Aug. 28, 2015.
International Preliminary Report on Patentability Corresponding to PCT/EP2015/062247 dated Oct. 10, 2016.

* cited by examiner

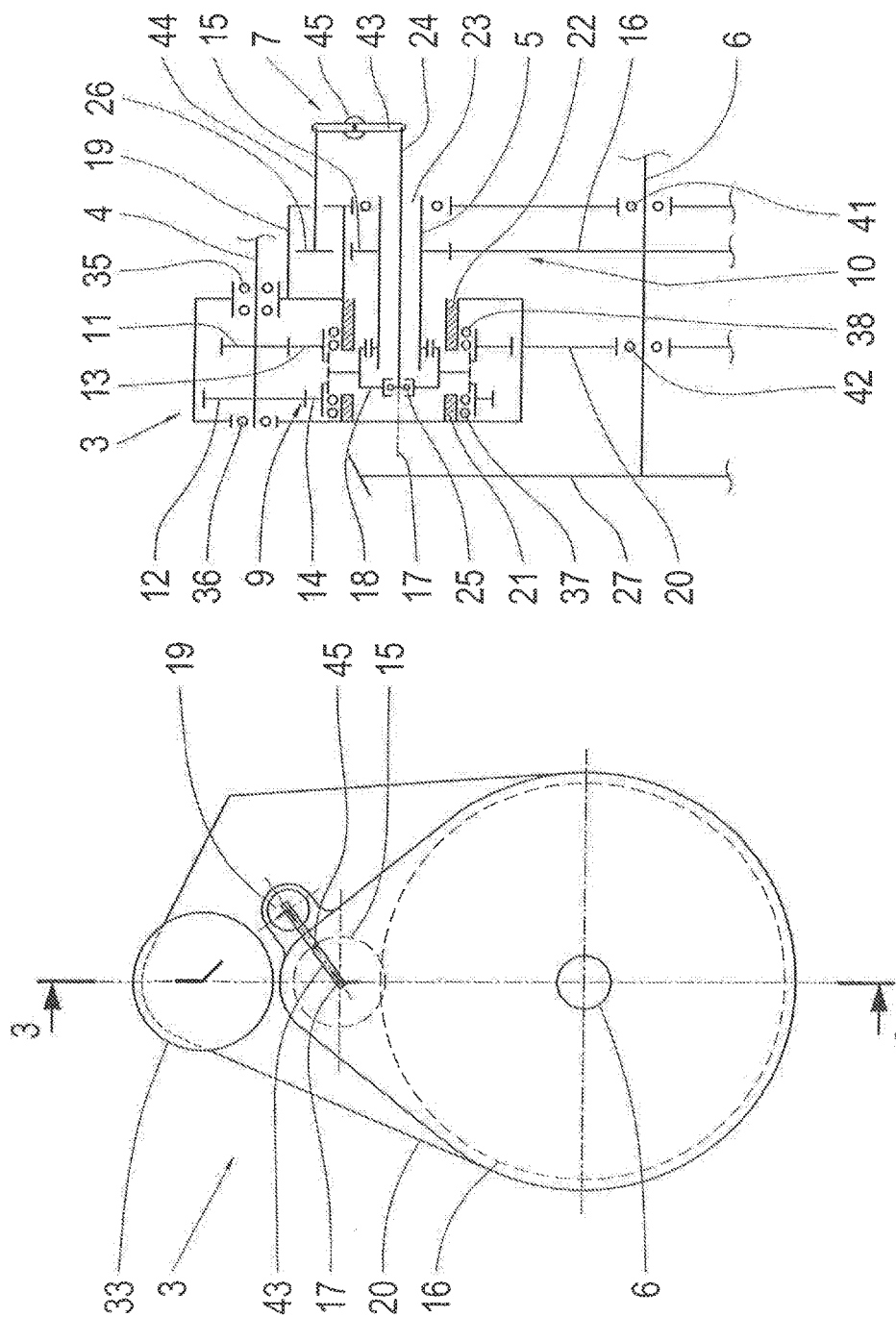

TRANSMISSION FOR THE POWERTRAIN OF A RAIL VEHICLE

This application is a National Stage completion of PCT/EP2015/062247 filed Jun. 2, 2015, which claims priority from German patent application serial no. 10 2014 213 010.7 filed Jul. 4, 2014.

FIELD OF THE INVENTION

The invention concerns a transmission for the power-train of a rail vehicle, in particular an electrically driven multiple-unit train, and a power-train for a rail vehicle.

BACKGROUND OF THE INVENTION

Particularly in so-termed Electrical Multiple Units, denoted EMUs in what follows, until now in most cases one-stage or two-stage spur gear transmissions have been used to transmit the drive power from an electric drive motor to the wheelset shaft and the drive wheels. Among other things EMUs are used as Metro, subways or underground railways in public transport systems. In this context a Metro is a crossing-free system which is independent of other traffic systems and motorized individual traffic. Metro vehicles are almost exclusively electrically driven. A Metro vehicle designed as a locomotive has at least one driven axle coupled to an electric drive motor, which is also known as a driving wheelset. Furthermore, such a locomotive can also comprise one or more idler wheelsets not coupled to a drive motor.

Owing to differences in the maximum operating speeds, which for Metro vehicles amount as a rule to between 60 km/h and 130 km/h, and varying motor designs, the transmission ratios usually vary conventionally between 6 and 12. However, power-trains of such rail vehicles used in practice usually have no speed-change transmissions or gearshift transmissions, i.e. the power-train has only a single, non-variable transmission ratio. Until now this had led to the need that depending on the transmission ratio required, which is chosen as a function of the maximum operating speed envisaged, a transmission is chosen from a large number of transmission variants with different sizes and transmission ratios, which are in stock or on offer, and built into the rail vehicle. Thus, the manufacturers of such rail vehicle transmissions offer transmissions variants of different sizes, so that the possibility of using similar components for the different transmission sizes is extremely limited. This increases the manufacturing and warehousing costs, both for new transmissions and also for replacement parts.

The necessary speed adaptations of the rail vehicle and the rotational direction reversal for reversing the travel direction are carried out by rotational speed regulation and by selecting the desired rotational direction of the electric drive motor. This, however, entails high operating costs because the electric drive motor, and where applicable an inverter, are usually not operated in the optimum efficiency range so that more energy is consumed. Since in contrast to internal combustion engines electric drive motors have two equivalent rotational directions, there is no need to provide a reversing transmission when an electric drive motor is used.

DE 102011011867A1 discloses a transmission for the power-train of a rail vehicle, in particular a Metro vehicle, in which the transmission comprises two transmission stages connected one behind the other. For this, the transmission has an input shaft, an intermediate shaft and a drive output shaft. In this case the drive output shaft of the transmission forms a wheelset shaft of the rail vehicle, on which the two wheel disks of drive-wheels of the rail vehicle are mounted in a rotationally fixed manner. For that reason such a transmission is also known as a wheelset transmission. This transmission is intended to cover a wide range of transmission ratios in order thereby to reduce the above-described, disadvantageous diversity of variants. By virtue of design modifications the overall transmission ratio range can be changed further.

SUMMARY OF THE INVENTION

The purpose of the present invention is to propose a transmission for the power-train of rail vehicles, which enables reliable operation with low operating costs in as broad a range of applications as possible. Furthermore, owing to the limited fitting space available in the substructure of a rail vehicle, the dimensions of the transmission should be as compact as possible.

These objectives are achieved by a transmission and a power-train as described below.

A transmission for the power-train of a rail vehicle is proposed, such that the transmission has an input shaft, an intermediate shaft and an output shaft. The input shaft can be connected so that it can be driven by a drive motor and the output shaft forms a wheelset shaft of the rail vehicle. The transmission has at least two selectively shiftable transmission stages, with different transmission ratios for the same travel direction, and a shifting device for engaging the transmission stages.

The drive motor is preferably an electric motor, for example an asynchronous motor. The at least two shiftable transmission stages have quantitatively different transmission ratios and the same rotational direction, so that the rail vehicle is equipped with at least two gears for each travel direction.

In rail vehicle construction a wheelset shaft is that axle to which the two wheel disks of the axle concerned are rotationally fixed. Transmissions that include the wheelset shaft at least in part are referred to as wheelset transmissions. Accordingly, the transmission proposed in this case can also be referred to as a shiftable wheelset transmission.

The two shiftable transmission stages enable driving operation in which the drive motor can always be operated in a favorable efficiency range. Both internal combustion engines and electric motors can be associated with efficiency ranges, which vary in accordance with the motor rotational speed at the time. With the help of the shiftable transmission according to the invention in the power-train, the drive motor can therefore be operated in rotational speed ranges in which the drive motor is always operating with good efficiency. For example, the transmission stage with the higher transmission ratio can be used as the starting gear, while upward of a certain travel speed a shift is carried out to the other transmission ratio stage. As a result, the operating costs of the rail vehicle can be substantially reduced.

The two transmission stages are preferably formed as a first spur gear pair with a first and a third spur gear, and as a second spur gear pair with a second and a fourth spur gear. In this case the first and second spur gears are arranged rotationally fixed on the input shaft and the third and fourth spur gears can in each case rotate about an intermediate shaft axis.

A spur gear arranged rotationally fixed on a shaft is also referred to as a fixed wheel. In contrast, a spur gear arranged so that it can rotate relative to the shaft on which it belongs is called a loose wheel. In the preferred embodiment of the transmission the loose wheels can be connected in a rotationally fixed manner to the intermediate shaft, depending on the transmission stage chosen. Alternatively, however, the arrangement of the loose wheels and fixed wheels relative to the input shaft and the intermediate shaft can be the other way round, i.e. the loose wheels can also be arranged on the input shaft and the fixed wheels on the intermediate shaft.

A spur gear is understood to be a spur gearwheel with straight or oblique teeth. A spur gear pair consists of two spur gears whose spur teeth are permanently engaged with one another.

It is preferably provided that relative to a housing of the transmission, the third and fourth spur gears are mounted to rotate in each case on a bearing support stud fixed to the housing. That is to say, although the loose wheels of the proposed transmission, namely the third and fourth spur gears, rotate about the intermediate shaft axis, they are not mounted on the intermediate shaft. This enables a stable, durable and compact design of the bearing points for the intermediate shaft and the two loose wheels.

The shifting device preferably comprises a shifting member which is mounted rotationally fixed but axially movable relative to the intermediate shaft, such that by virtue of an actuator the shifting device can be displaced axially in such manner that the second spur gear or the fourth spur gear can selectively be connected to the intermediate shaft in a rotationally fixed manner.

The shifting device can be in the form of a sliding sleeve. Sliding sleeves, as parts of gearshift transmissions, are sufficiently well known to those with knowledge of the subject. To make the shifts more comfortable, i.e. free from jerks, a mechanical synchronizer known per se, which is active on one or both sides, can be arranged on the shifting member or sliding sleeve.

As the actuator, basically a pneumatically, hydraulically, electromagnetically or electromechanically operated actuator can be used. Preferably a pressure-medium-actuated cylinder-piston unit is provided, since as a rule compressed air is already available in rail vehicles so that the cost and complexity of providing it are minimized.

Furthermore, in addition to the two transmission ratio stages the shifting device can also have a neutral position in which the second and the fourth spur gears can rotate freely relative to the intermediate shaft, so that the force flow between the input shaft and the drive output shaft is interrupted. In connection with the neutral position, emergency release means can also be provided on the shifting device, with the help of which the neutral position can be engaged in the event of a defect in the power-train. For example, a wheelset blocked due to a defective power-train can be brought again to a freely rotating condition so that the rail vehicle can be towed away or operated further by other power-trains.

In a further preferred design, the intermediate shaft is in the form of a hollow shaft with an axial bore and the shifting member can be actuated through the bore. This actuation of the shifting member through the bore enables a very compact structure of the transmission.

For this, the actuator can be attached on the housing and connected to the shifting member by an axially movable shift-rod that passes through the intermediate shaft. Preferably, the actuator is in the form of a pressure-medium-actuated cylinder-piston unit whose movable piston is connected to the shift-rod. In this case the cylinder of the cylinder-piston unit is for example attached on the outside of the housing. The shift-rod passing through the intermediate shaft can if necessary be fitted intermediately in the bore by means of a radial bearing which allows the shift-rod to move axially.

Additional fitting space can be saved if the actuator is connected fixed to the intermediate shaft and is arranged at least partially in the bore of the intermediate shaft. In this way the actuator can be integrated still more in the intermediate shaft and more space is saved. For this, for example, part of the bore can be used directly as the cylinder component. In such a design the actuating medium or compressed air can be fed to the actuator rotating along with the intermediate shaft, from a component fixed to the housing via a rotary feedthrough.

A further preferred embodiment of the invention comprises a drive output stage in the form of a third spur gear pair. The drive output stage comprises a fifth spur gear arranged rotationally fixed on the intermediate shaft. Relative to the first and second spur gear pairs, the third spur gear pair is arranged on the side of the transmission facing toward the drive motor. This motor-facing arrangement of the drive output stage provides fitting space for a wheel-disk brake on the opposite side of the transmission in the area of the associated wheel disk.

Finally, the present invention also includes a power-train for a rail vehicle with an electric drive motor connected via a shaft coupling so as to drive an input shaft of a transmission. The transmission has an input shaft, an intermediate shaft and a drive output shaft. The drive output shaft is in the form of a wheelset or is connected via a sprung component with the wheelset. The transmission in this power-train has at least two selectively shiftable transmission stages with different transmission ratios for the same travel direction and a shifting device for engaging the transmission stages.

According to a first alternative the power-train can accordingly be made as a partially sprung drive, in which the drive motor is mounted on a vehicle chassis or a bogie and in which the transmission is supported on the wheelset shaft. Thus, the transmission belongs at least in part to the unsprung mass of the rail vehicle, whereas the drive motor is part of the sprung mass. In this case the transmission is also referred to as an axle-riding transmission.

According to a second alternative the power-train can be a fully sprung drive by virtue of a sprung component between the drive output shaft and the wheelset shaft. In this case the drive motor and the transmission are fixed directly to one another or to a common frame or bogie of the rail vehicle. The sprung component preferably comprises a cardan coupling of the type familiar to those with knowledge of the field from the documents EP0698540A1 and EP2626580A2. In this case the drive torque is transmitted to the wheelset shaft by way of a hollow shaft through which the wheelset shaft passes. Such a drive system is therefore also called a hollow-shaft drive.

The arrangement of the individual components in the power-train can advantageously be chosen such that the actuator of the shifting device is arranged close to the shaft coupling, so that during operation the rotating shaft coupling will produce an airflow in the area of the actuator, whereby the actuator is cooled. This increases the life of the actuator, especially in Metro trains with a high shifting frequency which produces high temperatures at the actuator.

The transmission proposed above also enables an advantageous arrangement of a wheel-disk brake in the area of a wheel disk of the wheelset shaft. This provides that the wheel-disk brake is arranged in the axial and in the radial direction at least partially in the area of the maximum projected dimensions of the transmission housing. Particularly because of the arrangement of the drive output stage in the transmission on the motor side, additional fitting space in the form of a recess on the outside of the transmission housing is available on the side of the transmission facing toward the wheel disk. The wheel-disk brake can at least partially fit into the space of this recess.

Particularly suitable for the application of the present invention are so-termed Electrical Multiple Units (EMUs) consisting of one or more multiple-unit trains.

As a rule, a multiple-unit train is understood to be a unit consisting of several rail vehicles or train segments. One rail vehicle or train segment, a plurality of rail vehicles or train segments, or all the rail vehicles or train segments of the multiple unit can in each case have a power-train.

BRIEF DESCRIPTION OF THE DRAWINGS

Below, an example of the invention is described in more detail with reference to the attached figures, which show:

FIG. 2: A side view from the drive input side of an embodiment of a transmission according to the invention, FIG. 3: A sectioned view of the transmission along the section line 3-3 in FIG. 2, and FIG. 4: A perspective view of a transmission according to the invention.

DETAILED DESCRIPTION OF THE PREFERRED EMBODIMENTS

Figure 1:
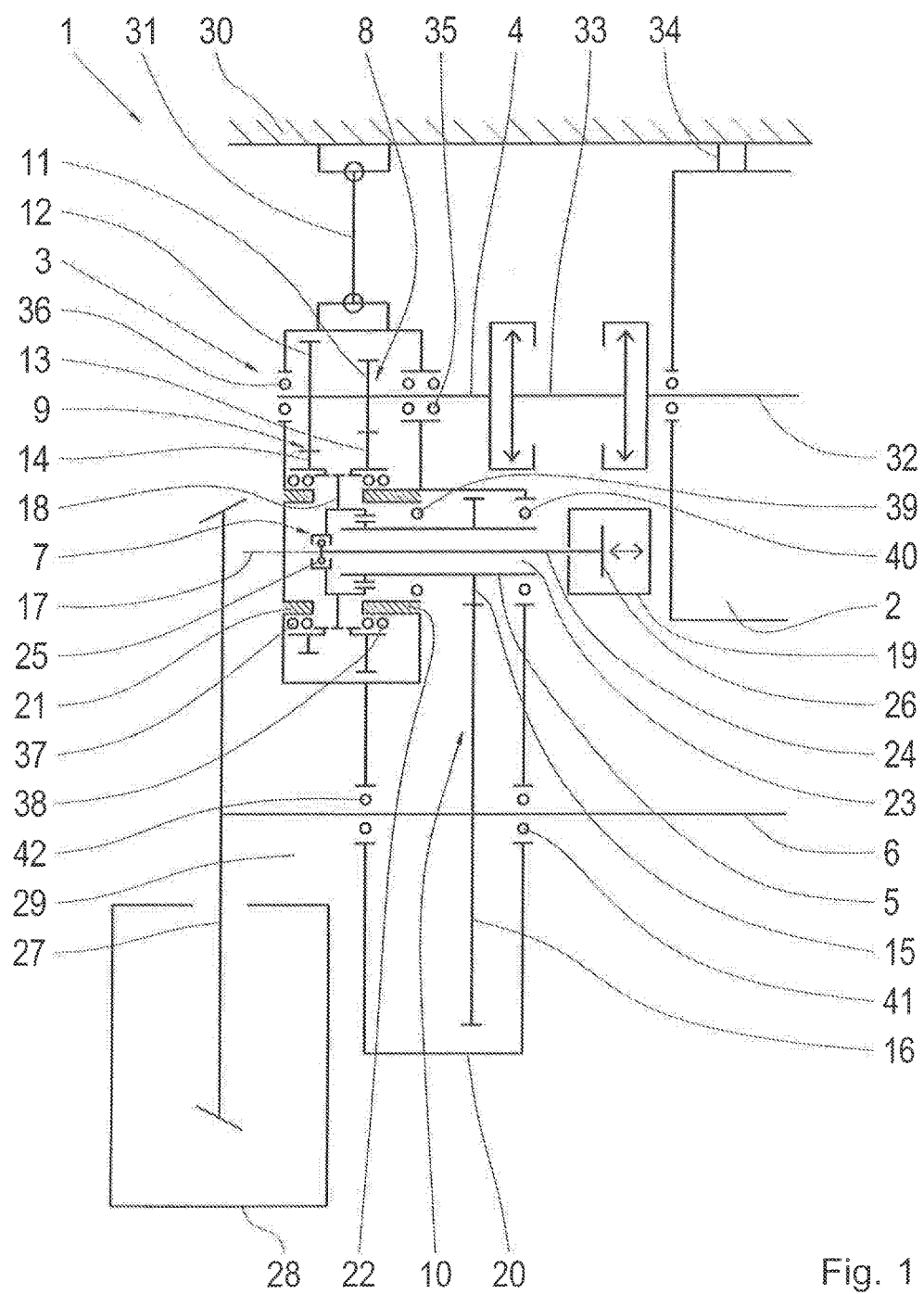
FIG. 1: A schematic representation of a power-train according to the invention.

The power-train 1 of a rail vehicle shown in FIG. 1 consists essentially of an electric drive motor 2, whose motor output shaft 32 is connected by means of a cardan shaft coupling 33 to the input shaft 4 of the transmission 3. In addition, the drive output shaft 6 of the transmission 3 is part of the power-train 1, the drive output shaft 6 being in the form of a wheelset shaft at the two ends of which in each case a wheel disk 27 is attached. For the sake of clarity only one wheel disk 27 is shown in FIG. 1.

The drive motor can for example be designed as an asynchronous motor and is connected solidly by a motor bracket 34 to a vehicle frame 30 of the rail vehicle. The vehicle frame 30 can for example be a chassis. Suitable as the cardan coupling 33 are, besides the symbolically illustrated curved-tooth coupling, also shaft couplings with elastic elements such as reinforced rubber strips or rubber disks, which allow a certain amount of angular, radial and/or axial movement of the ends of the shafts to be connected. The input shaft 4 is mounted in a housing 20 of the transmission 3 by means of two roller bearings 35 and 36.

On one side, the transmission 3 is supported on the wheelset shaft or drive output shaft 6 by way of two roller bearings 41 and 42. In addition the transmission 3 is supported and able to move relative to the vehicle frame 30 by a torque support 31. Such an arrangement or suspension of the power-train in the rail vehicle is also called a partially sprung drive, because part of the mass of the power-train, namely the drive motor 2, is connected fixed to the sprung vehicle frame 30, while another part of the mass of the power-train, namely the transmission 3, is supported essentially on the unsprung wheelset shaft.

On the wheel disk 27 is arranged a wheel-disk brake 28. The arrangement of the drive output stage in the form of the third spur gear pair 10 on the motor side allows room for a recess 29 on the outside of the transmission 3, in which the wheel-disk brake 28 is at least partially accommodated. In other words, the wheel-disk brake 28 is arranged in the axial and radial direction partly in the area of the maximum projected dimensions of the housing 20 of the transmission 3. In this way the restricted space in the substructure of the rail vehicle is used very advantageously.

Three spur gear pairs 8, 9 and 10 are arranged in the housing 20 of the transmission 3. The first spur gear pair 8 consists of a first spur gear 11 and a third spur gear 13. The first spur gear 11 is arranged as a fixed wheel rotationally fixed on the input shaft 4. The third spur gear 13 is permanently engaged with the first spur gear 11. The third spur gear 13 is a loose wheel and is mounted to rotate by virtue of a roller bearing 38 about an intermediate shaft axis 17 on a bearing support 22 of the housing 20.

The second spur gear pair 9 consists of a second spur gear 12 and a fourth spur gear 14. The second spur gear 12 is a fixed wheel arranged rotationally fixed on the input shaft 4. The fourth spur gear 14 is permanently engaged with the second spur gear 12. The fourth spur gear 14 is a loose wheel, and is mounted to rotate by virtue of a roller bearing 37 about an intermediate shaft axis 17 on a bearing support 21 of the housing 20.

The first spur gear pair 8 forms a first transmission stage, which can be used as a starting gear. The second spur gear pair 9 forms a second transmission stage, which is used at higher speeds.

An intermediate shaft 5 is mounted to rotate in the transmission housing 20, about the intermediate shaft axis 17, by virtue of two further roller bearings 39 and 40. The intermediate shaft 5 is a hollow shaft with a bore 23. The bore 23 is coaxial with the intermediate shaft axis 17 and passes completely through the intermediate shaft 5.

A fifth spur gear 15 is connected to the intermediate shaft 5 in rotationally fixed manner. This fifth spur gear 15 is continuously engaged with a sixth spur gear 16, which is fixed to the drive output shaft 6 in a rotationally fixed manner. Together, the fifth and sixth spur gears 15 and 16 form a third spur gear pair 10, which in turn forms the drive output stage of the transmission 3. Thus, the sixth spur gear 16 can be regarded as part of the wheelset, which consists essentially of the drive output or wheelset shaft 6, the wheel disks 27 and the sixth spur gear 16. The drive output shaft 6 or wheelset shaft is mounted in the housing 20 by means of roller bearings 41 and 42.

To shift the transmission from the first transmission stage to the second transmission stage and vice-versa, a shifting device 7 is provided. With the shifting device 7 a neutral position can also be engaged, in which the second and fourth spur gears are arranged to rotate freely relative to the intermediate shaft, so that the force flow between the input shaft and the drive output shaft is interrupted. In FIG. 1 the shifting device 7 is shown in its neutral position.

The shifting device 7 comprises a shifting member 18, which can be actuated through the bore 23 in the intermediate shaft 5. The shifting member 18 is in the form of a sliding sleeve which is rotationally fixed relative to the intermediate shaft 5 but can be moved axially on the intermediate shaft 5. To move the shifting member 18 on the intermediate shaft 5, the shifting member 18 has in its radially inner area, inner teeth which can slide back and forth on outer teeth of the intermediate shaft 5. On its outer circumference the shifting member 18 has outer teeth which can be brought into engagement by axial displacement, either with the inner teeth of the third spur gear 13 or with the inner teeth of the fourth spur gear 14, whereby the force flow is transmitted with the respectively appropriate transmission ratio. In the neutral position shown in FIG. 1 the shifting member 18 is in a central position in which the outer teeth of the shifting member 18 are not engaged with either of the inner teeth of the two loose wheels or spur gears 13 or 14, whereby the force flow from the input shaft 4 to the drive output shaft 6 is interrupted.

The axial shifting movements of the shifting member 18 can be controlled by an actuator 19, which is attached for example to the transmission housing 20. The actuator 19 is connected to the shifting member 18 by way of a shift-rod 24 which passes through and is able to move axially within the bore 23. At its end remote from the actuator, the shift-rod 24 is connected by way of an axial bearing 25 to the shifting member 18. The axial bearing 25 is needed in order to decouple the shift-rod 24 from the rotational movement of the shifting member 18. During operation the shifting member 18 rotates together with the intermediate shaft 5, whereas in contrast the shift-rod 24 is connected in a rotationally fixed manner to the axially movable part of the actuator 19 fixed on the housing.

In the present embodiment the actuator 19 is in the form of a compressed-air-actuated cylinder-piston unit. The movable piston 26 is connected to the shift-rod 24. It is also conceivable to make the piston 26 and the shift-rod 24 integrally, as one piece.

The actuator 19 is arranged close to the shaft coupling 33 in such a position that during operation the rotating shaft coupling 33 produces an airflow in the area of the actuator 19 such that the actuator 19 is cooled by the airflow.

The transmission 3 shown in FIGS. 2 and 3 corresponds to the transmission 3 in FIG. 1 except for the arrangement of the actuator 19 and the consequent modifications of the shifting device 7. Accordingly, in the figures the same components are denoted by the same indexes. In what follows, above all the features in FIGS. 2 and 3 that differ from the embodiment in FIG. 1 are described.

In the side view of the transmission 3 shown in FIG. 2, the shaft coupling 33 on the drive input side is shown schematically in the upper area of the transmission 3. Under it can be seen the elements of the shifting device 7 which are arranged outside the housing 20.

In the lower part of the transmission 3 is arranged the sectioned drive output shaft 6. Using broken lines in each case, the fifth spur gear 15 is arranged in a rotationally fixed manner to the intermediate shaft 5 and the sixth spur gear 16 arranged in a rotationally fixed manner to the drive output shaft 6 are shown.

Furthermore, of the shifting device 7 the actuator 19 and a tilt-lever 43 can be seen, the latter arranged to pivot about a pivot axis 45. Below, the function of the tilt-level 43 will be explained in more detail with reference to FIG. 3.

FIG. 3 shows a sectioned view of the transmission 3 from FIG. 2, with the wheelset shaft or drive output shaft 6 and a wheel disk 27 fixed thereto. In this embodiment the actuator 19 is fixed on the outside of the housing 20 parallel to the shift-rod 24 in a space-saving manner. In this case too the actuator 19 is made as a cylinder-piston unit, wherein a piston rod 44 connected to the axially movable piston 26 of the cylinder-piston unit is connected to the shift-rod 24 by way of a tilt-lever 43. The tilt-lever 43 is arranged so that it can pivot about a pivot point 45 fixed relative to the housing. With this arrangement the cylinder of the cylinder-piston unit 19 can also be integrated in the housing 20 or made integrally with the housing 20.

This arrangement of the actuator 19 is advantageously chosen when the distance between the transmission 3 and the drive motor 2 is very small, so that there is no room for an arrangement of the actuator 19 as in FIG. 1.

Figure 4:
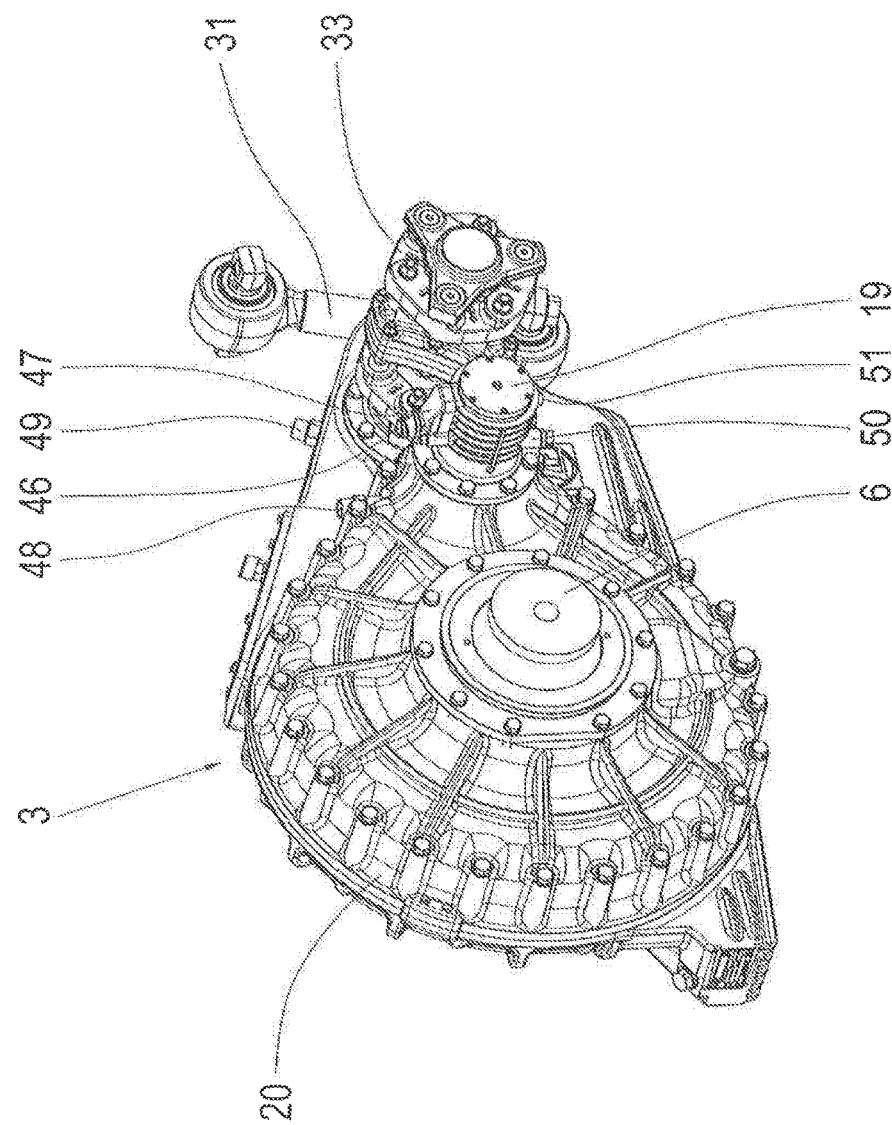

Finally, FIG. 4 shows a design of the transmission 3 shown schematically in FIG. 1. In the perspective view of FIG. 4, the compact, space-saving structure of the transmission 3 can be recognized. The transmission 3, designed as a shiftable wheelset transmission, needs no more fitting space than a non-shiftable wheelset transmission with two transmission stages as described at the beginning, so that the transmission 3 according to the invention can be exchanged for a conventional transmission even in existing rail vehicles, without much effort.

The transmission 3 is supported at the drive input side end of the housing 20 by the torque support 31 on a vehicle frame or on the bogie of the rail vehicle. In addition, the transmission 3 is supported by the bearing of the drive output shaft 6 directly on the wheelset shaft. Accordingly, such a transmission is also called an axle-riding transmission.

From the shifting unit 7 there projects outward from the housing 20 only the cylinder of the actuator 19 made in the form of a cylinder-piston unit. The cylinder is arranged parallel to the shaft coupling 33 and close to it, so that when the shaft coupling 33 is rotating, an airflow is produced by the shaft coupling, which cools the nearby cylinder of the actuator 19. On the actuator 19 is arranged a path sensor 47. During operation this path sensor 47 detects the current position of the piston of the cylinder-piston unit 19 and hence also the position of the shifting member 18. Particularly in combination with a claw-shifted shifting unit it is important to know the exact position of the shifting member 18 during a shifting process, in order to enable as jerk-free and speedy a shift as possible. The signals from the position sensor 47 are passed on by way of a connection 46 to a transmission control unit (not shown) and/or to the train control unit that controls the shifting processes of the transmission 3. The connection 46 can for example be a plug connector.

The transmission 3 also comprises respective sensors for detecting the rotational speeds of the input shaft 4 and the intermediate shaft 5. The signals from the rotational speed sensors are passed on via the connections 48 and 49 to the transmission control unit and/or the train control unit, and are therefore available for controlling the shifting processes of the transmission 3. The connections 48 and 49 too can for example be in the form of plug connectors.

To supply the actuator 19 made in the form of a cylinder-piston unit with compressed air, the actuator 19 has two compressed air connections 50 and 51. By way of these compressed air connections 50 and 51, the actuator 19 is for example connected to a valve block, which can in turn be actuated by the transmission control unit and/or the train control unit for the purpose of controlling the shifting processes in the transmission 3.

INDEXES

1 Power-train
2 Drive motor
3 Transmission
4 Input shaft
5 Intermediate shaft
6 Drive output shaft
7 Shifting device
8 First spur gear pair
9 Second spur gear pair
10 Third spur gear pair 11 First spur gear
12 Second spur gear
13 Third spur gear
14 Fourth spur gear
15 Fifth spur gear
16 Sixth spur gear
17 Intermediate shaft axis
18 Shifting member
19 Actuator
20 Housing
21 Bearing support
22 Bearing support
23 Bore
24 Shift-rod
25 Axial bearing
26 Piston
27 Wheel disk
28 Wheel disk brake
29 Recess
30 Vehicle frame
31 Torque support
32 Motor drive output shaft
33 Shaft coupling
34 Motor support
35 Roller bearing
36 Roller bearing
37 Roller bearing
38 Roller bearing
39 Roller bearing
40 Roller bearing
41 Roller bearing
42 Roller bearing
43 Tilt-lever
44 Piston rod
45 Pivot point
46 Connection
47 Position sensor
48 Connection
49 Connection
50 Compressed air connection
51 Compressed air connection

The invention claimed is:

1. A wheelset transmission for a power-train of a rail vehicle, the wheelset transmission comprising:
an input shaft,
an intermediate shaft,
a drive output shaft,
the input shaft being connectable so as to be driven by a drive motor,
the wheelset transmission having at least two selectively engagable transmission stages with different transmission ratios for a same travel direction, and a shifting device for selectively engaging the two transmission stages independent of each other,
the two transmission stages being formed of a first spur gear pair, including a first spur gear and a third spur gear, and a second spur gear pair, including a second spur gear and a fourth spur gear,
the first and the second spur gears each being arranged in a rotationally fixed manner on the input shaft whereas the third and the fourth spur gears each being arranged so as to rotate about an intermediate shaft axis, and
the third and the fourth spur gears being mounted to rotate in a housing of the wheelset transmission in each case on a bearing support stud fixed to the housing.

2. The wheelset transmission according to claim 1, wherein the shifting device comprises a shifting member being mounted rotationally fixed and axially movable relative to the intermediate shaf, the shifting member is axially movable by an actuator of the shifting device such that only one of the third spur gear and the fourth spur gear is selectively connectable to the intermediate shaft in a rotationally fixed manner at a time.

3. The wheelset transmission according to claim 2, wherein the intermediate shaft is a hollow shaft with an axial bore, and the shifting member is actuatable through the bore.

4. The wheelset transmission according to claim 3, wherein the actuator is fixed to the housing and is connected to the shifting member via an axially movable shift-rod that passes through the bored.

5. The wheelset transmission according to claim 4, wherein the actuator is a cylinder-piston unit which has a movable piston that is connected to the shift-rod.

6. The wheelset transmission according to claim 3, wherein the actuator is solidly connected to the intermediate shaft and is arranged at least partially inside the bore of the intermediate shaft.

7. The wheelset transmission according to claim 1, wherein the shifting device is shiftable to a neutral position in which the third and the fourth spur gears are freely rotatable relative to the intermediate shaft so that a force flow, between the input shaft and the drive output shaft, is interrupted.

8. The wheelset transmission according to claim 1, wherein a drive output stage forms a third spur gear pair which has a fifth spur gear arranged rotationally fixed on the intermediate shaft and a sixth spur gear arranged rotationally fixed on the drive output shaft, and the third spur gear pair is arranged, relative to the first and the second spur gear pairs, on a side of the transmission facing toward the drive motor.

9. The wheelset transmission according to claim 1, wherein the shifting device being axially movable to selectively engage only one of the two transmission stages at a time into a flow of force from the input shaft to the output shaft.

10. The wheelset transmission according to claim 1, wherein the shifting device being axially movable between at least first and second positions such that:
in the first position, the shifting device rotationally couples the third spur gear to the intermediate shaft and the fourth spur gear is disengaged from the intermediate shaft, and
in the second position, the shifting device rotationally couples the fourth spur gear to the intermediate shaft and the third spur gear is disengaged from the intermediate shaft.

11. The wheelset transmission according to claim 1, wherein the third and the fourth spur gears in each case being mounted, via a bearing, on the bearing support studs independent of the intermediate shaft.

12. The wheelset transmission according to claim 1, wherein the third and the fourth spur gears being rotatable about the intermediate shaft axis relative to the intermediate shaft.

13. A power-train for a rail vehicle, having an electric drive motor connected by a shaft coupling so as to drive an input shaft of a wheelset transmission,
wherein the wheelset transmission comprises the input shaft, an intermediate shaft and a drive output shaft,
the drive output shaft is either formed as a wheelset shaft or is connected, via a sprung component, to the wheelset shaft, the wheelset transmission comprises at least two selectively shiftable transmission stages with different transmission ratios for a same travel direction, and a shifting device for engaging the transmission stages, an actuator of the shifting device is arranged close to the shaft coupling in such a manner so that, during operation, the rotating shaft coupling produces an airflow in an area of the actuator such that the actuator is cooled by the airflow, and the sprung component comprises a cardan coupling.

14. The power-train according to claim 13, wherein a wheel-disk brake is arranged in an area of a wheel disk and is arranged in an axial and a radial direction at least partially in an area of a maximum projected dimension of a housing of the transmission.

15. A wheelset transmission for a power-train of a rail vehicle, the wheelset transmission comprising:

an input shaft, a hollow intermediate shaft having an axial bore, a drive output shaft, the input shaft being drivably connectable to a drive motor;

at least first and second spur gear pairs having different transmission ratios for a common travel direction, and a shifting device for selectively engaging the first and the second spur gear pairs;

the first spur gear pair having a first spur gear and a third spur gear;

the second spur gear pair having a second spur gear and a fourth spur gear;

the first and the second spur gears being connected to the input shaft in a rotationally fixed manner so as to rotate with the input shaft;

the third and the fourth spur gears being rotatably supported on a respective bearing support stud which being fixed to a housing of the wheelset transmission such that the third and the fourth spur gears are rotatable about an intermediate shaft axis;

the shifting device comprises a shifting member which is rotationally fixedly mounted and axially movably relative to the intermediate shaft, and the shifting member is axially movable by an actuator of the shifting device such that either the third spur gear or the fourth spur gear is selectively connectable to the intermediate shaft in a rotationally fixed manner; and the shifting member is actuatable by the actuator through the axial bore in the intermediate shaft.

\* \* \* \* \*